WILLIAM E. WORTHEN
Improvement in Vertical Hoists.
No 120,844.
Patented Nov. 14, 1871.
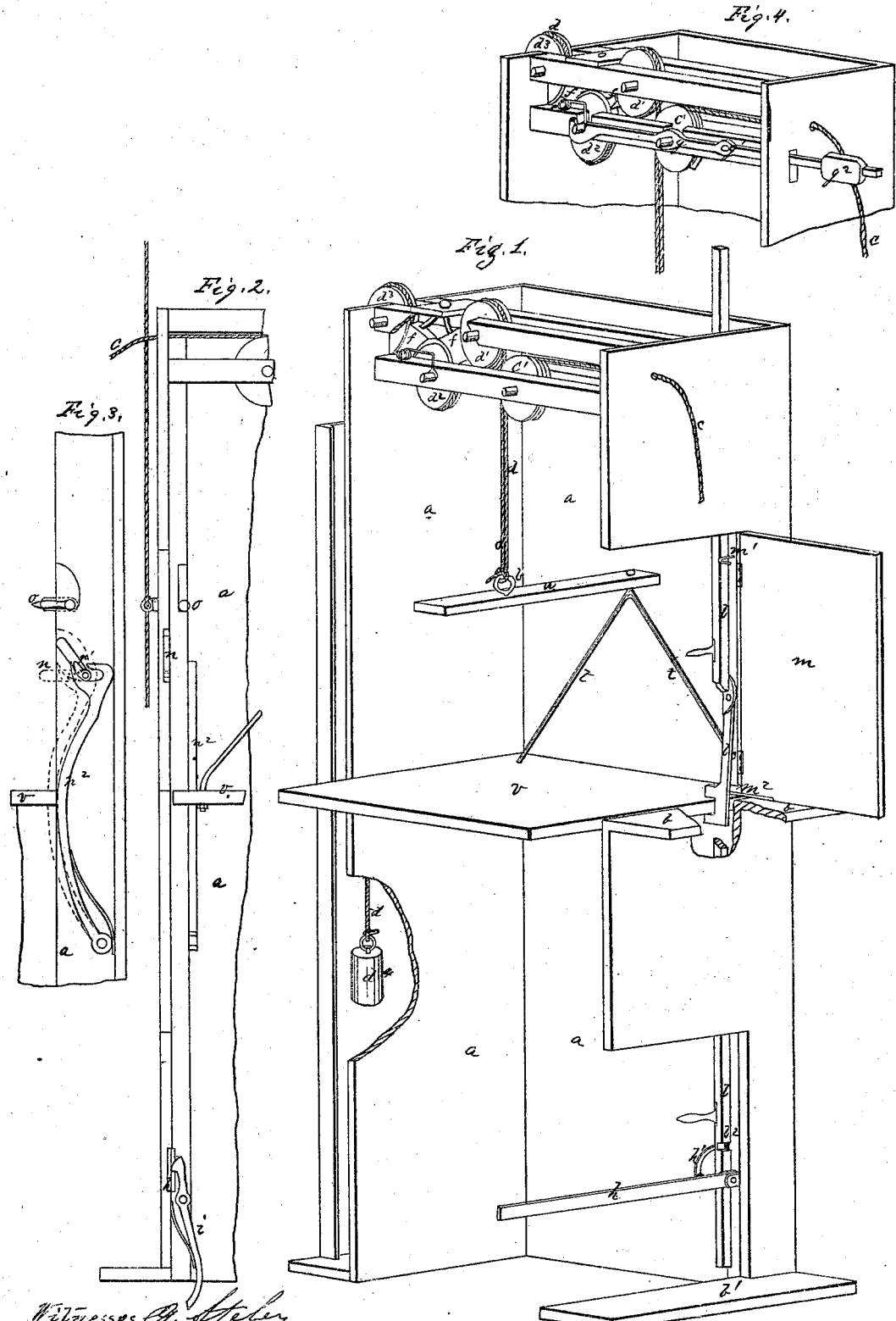

120,844

UNITED STATES PATENT OFFICE.

WILLIAM E. WORTHEN, OF NEW YORK, N. Y.

IMPROVEMENT IN VERTICAL HOISTS.

Specification forming part of Letters Patent No. 120,844, dated November 14, 1871.

*To all whom it may concern:*

Be it known that I, WILLIAM E. WORTHEN, of the city, county, and State of New York, have invented certain new and useful Contrivances in Vertical Hoists so as to secure safety in the use thereof; and that the following, taken in connection with the drawings, is a full, clear, and exact description of the same.

In the drawings, Figure 1 is a sectional elevation, in isometrical perspective, exhibiting the hoist itself with my improvements applied thereto. Fig. 2 is an elevation of one of the sides thereof, not shown in the former figure. Fig. 3 is a partial elevation of the jamb of the door taken from the inside of the well. Fig. 4 is a sectional elevation, in isometrical perspective, of a modification.

This invention has for its object the improvement of vertical hoists in such manner as to secure persons and goods from injury—first, from the breaking of the hoist-rope, wire, belt, or chain that is used for hoisting; second, by preventing persons from falling into the well of the hoist through the openings at the landing at each of the various stories of the building in which the hoist is used. And it consists, first, in the arrangement of such devices as will prevent the cage or platform from suddenly falling when the hoist-rope breaks by accident or otherwise; second, in providing contrivances that will operate to open or close the doors or bars at the opening into the well at each story automatically, and when the cage or platform is at the proper height; and third, in providing devices for preventing the cage or platform from being moved from a given position until the door or bar that closes the opening into the well is shut.

In the drawings, $a\ a\ a$ represent the well of the hoist; $b\ b'$, portions of two floors. $v$ is the cage or platform of the hoist, having the usual lifting-rods $t\ t$ and beam $u$, with hoisting-ring $v'$, and constructed to closely and freely slide within the well of the hoist. C is the hoisting-rope, which goes from and is wound around and secured to a proper drum or other contrivance by which it is made to operate the platform, and which are not shown, and leads over pulley $C'$, that has its face vertically over the hoisting-ring $v'$ in beam $u$, where it is made fast. Pulley $C'$ is fast on an axle that freely revolves in fixed bearings at the proper height above the upper landing or opening at which the platform may be hoisted. $d$ is an auxiliary or secondary rope attached to ring $v'$, and thence goes vertically over pulley $d^1$, having its axis revolving in fixed bearings above pulley $C'$; then down and around pulley $d^2$, whose axis revolves in movable or flexible bearings that are horizontal or nearly horizontal with the bearings of pulley $C'$; then upward over pulley $d^3$, that is in position horizontal with pulley $d^1$; and then downward, and terminating with a weight of the proper heft to affect the object or purpose. Pulley $d^2$ is mounted upon an axis that is allowed to rise and fall, and is held down by springs $e$. $f\ f$ are friction-blocks or brakes, mounted by preference on light springs, which hold them out of contact with the pulleys $d^1$, $d^2$, and $d^3$, while pulley $d^2$ is held down upon its bearings and has not been raised, for as long as the hoisting-rope C is active in lifting or lowering the platform the strain upon pulley $d^2$ through the rope $d$ tends to lift it upward to the extent of the heft of weight $d^4$, which cannot be greater than twice the weight $d^4$, while spring $e$, or a weight performing the same duty, must be strong enough to hold pulley $d^2$ down; but when the hoisting-rope C breaks the whole weight of the platform and its contents is thrown upon the auxiliary rope $d$; then pulley $d^2$ immediately lifts, under the sudden strain, forcing spring $e$ up and the pulley $d^2$ hard against the brake-blocks $f\ f$, which in turn are forced against the pulleys $d^1$ and $d^3$, when all the three pulleys will be so jammed that they cannot revolve, or if they revolve it will be slow and ease the platform and its load down safely. Weight $d^4$ may be heavy enough to nearly or quite counterbalance the cage or platform; but a certain relation should exist between the weight $d^4$ and spring $e$ in order to have all the parts work well together, for when the emergency comes the weight must be heavy enough to force pulley $d^2$ and the brake-blocks against pulleys $d^1$ and $d^3$, and overcome the action of the spring $e$ to hold pulley $d^2$ down.

Fig. 4 shows a modification in construction, but not departing from the principle of operation, and where the relative position of the pulleys is maintained, as above described; but pulley $C'$ is mounted and journaled on lever $g$, pivoted at $g^1$, and provided with a counter-weight, $g^2$. Pulley $d^2$ is also journaled in and at the end opposite to weight $g^2$ on lever $g$, and when the hoisting-rope is active pulley $C'$ is held down by the weight of the cage or platform through rope C, and counterpoise $g^2$ cannot lift the pulley $d^2$; but if the rope C breaks the weight of the platform is transferred to rope $d$, whereby pulley $d^2$ is raised by the combined action of the weight of the cage or platform and counterpoise $g^2$. $l$ is a sliding rod placed vertically in the well and extending its entire height, and is commonly called a "start," and is arranged in its position as shown in the drawings, when it holds the link motion of the hoisting engine or other device for stopping the motion of the drum upon which the hoisting-rope is wound in such position that the rope remains at rest. $h$ is a bar hinged at one side of the lower opening in well $a$, so that it swings upward to a vertical position in opening. $h'$ is a circular arm or quadrant fast to the hinged bar $h$, and curved upward and over toward the hinge of bar $h$, and as bar $h$ is raised the quadrant or curved arm $h'$ enters into a notch, $l^2$, cut in and transversely across the start $l$, and as the bar $h$ is raised and turned over the arm $h'$ enters into the notch $l^2$ of the start $l$ and prevents any further motion of the start or platform until the bar $h$, that partially closes the opening into the well, is shut down. Bar $h$ is held fast in place by a pivoted lever-catch, $i$, bent in the form as seen in Fig. 2, and has a spring to hold it in place over bar $h$ until the passing platform strikes the lower and bent end of said catch $i$ and forces it away from holding the bar $h$ longer in place, and it is free to be raised by spring, weight, or by hand.

In the drawings two openings only are shown; but it is understood that the well can be extended to any height or past any number of stories of a building, and the invention be the same; and fully shows the devices that are employed, however many openings or doors there may be in the well. The upper opening is closed by a door, $m$, the axes of whose hinges are vertical. Door $m$ is kept shut by a swinging latch, $n$, seen in Figs. 2 and 3, mortised in the jamb, and is provided with a cam, $n^1$, acted upon by a spring-lever, $n^2$. When the lever is forced by the passing platform into the position shown by full lines, Fig. 3, the latch $n$ is lifted and the door is free to open; but when the lever assumes the position shown in dotted lines (same figure) the latch is thrown and securely bolts the door $m$. When the latch is withdrawn the door may be opened by hand or by a spring, as seen at $m^1$, and when shut and latched it cannot be opened until the platform is on the level or near to the level of the floor $b$. While the door $m$ is opening a cam, $m^2$, attached to the door, throws a swinging lever, $l^3$, pivoted upon start $l$, into such position as that a notch in the lever catches on the platform or a stationary pin, and the start $l$, and consequently the platform, is prevented from moving until the door is shut, which forces the lever $l^3$ out of contact with the platform. I prefer to make the notch in lever $l^3$ longer than the platform is thick, and so arrange the lever $n^2$ that the platform in passing shall open its latch a little before it arrives on the story or floor level. The door will then open; the notch in $l^3$ will embrace the platform, which will, either in ascending or descending, carry the lever $l^3$ and the start $l$ with it into its intermediate position, or that corresponding to a stoppage of the hoisting-rope, thus causing the platform to cease moving, where it is held until the door shuts and moves the start. Cam $m^2$ may enter into a notch in the start, and the lever $l^3$ and its notch be dispensed with.

By the construction and modification above described in a hoisting-machine the advantages gained are, first, safety, as a door or a cross-bar is made to close the opening into the well, except when purposely opened by an attendant or automatically by the raising of the platform; secondly, the cage or platform cannot be made to leave the floor or opening into the well until the door or bar that closes the opening is shut, when the start is unlatched and the cage or platform can be operated, thus preventing persons from falling into the well, as it is never open except when necessary and the attendant present; and thirdly, safety from accident by the breaking of the hoisting-rope.

I am aware that a secondary or auxiliary rope or chain has been used in hoisting-machines, and I do not claim such secondary rope or chain, broadly; but What I do claim as my invention, and desire to secure by Letters Patent, is—

1. The combination of a secondary or auxiliary rope, $d$, and weight $d^4$, pulleys $d^1$, $d^2$, and $d^3$, and a brake or brake-block, $ff$, and the platform of a hoist, substantially as herein described.

2. The combination of a secondary or auxiliary rope, $d$, with a pulley or pulleys and a brake or brake-blocks, in the manner substantially as described.

3. The special arrangement herein described of three pulleys, one of which is free to rise and fall, with brake-blocks arranged between them, as represented and described.

4. The apparatus, substantially such as herein described, for unlatching a door or bar by the action of the platform of the hoist.

5. The apparatus, substantially such as described, by means of which the door or bar, when open, locks the "start," preventing it, and consequently the platform, from being moved until the door is shut.

6. In combination with a door, a secondary latch and a main latch, a spring to open the door, whereby the door is opened when the platform arrives at the desired height only when the secondary latch is unlatched, the combination being substantially such as described.

7. The connection between the start and the platform, in combination with a spring-door actuating this connection, the combination being substantially such as described, and operating to bring the platform to rest automatically in consequence of the opening of the door.

8. In combination with devices substantially such as described for unlatching the door by the platform, apparatus acting to lock the start when the door is open, substantially in the manner set forth.

9. In combination, devices for unlatching by the action of the platform, for opening the door, and for locking the start, all substantially such as described, so that the platform is the implement whereby the latch is unlatched, the door opened, and the start locked.

In testimony whereof I have hereunto subscribed my name.

WM. E. WORTHEN.

Witnesses:
A. FTELEN,
N. A. BEACH. (79)